(12) United States Patent
Sloan et al.

(10) Patent No.: US 7,789,408 B2
(45) Date of Patent: Sep. 7, 2010

(54) SUSPENSION ARRANGEMENT FOR REAR CASTERED WHEELS ON A WORK MACHINE

(75) Inventors: Charles Scott Sloan, Blakesburg, IA (US); Allan Wesley Rosenbalm, Blakesburg, IA (US); Thomas Daryl Bebernes, Ottumwa, IA (US)

(73) Assignee: Deere & Company, Moline, IL (US)

( * ) Notice: Subject to any disclaimer, the term of this patent is extended or adjusted under 35 U.S.C. 154(b) by 294 days.

(21) Appl. No.: 11/968,759

(22) Filed: Jan. 3, 2008

(65) Prior Publication Data
US 2009/0174166 A1    Jul. 9, 2009

(51) Int. Cl.
B60G 11/18    (2006.01)
B60G 11/20    (2006.01)

(52) U.S. Cl. ........................ 280/124.166; 280/124.169; 280/124.129

(58) Field of Classification Search .......... 280/124.169, 280/124.166, 124.164, 124.129, 124.13
See application file for complete search history.

(56) References Cited

U.S. PATENT DOCUMENTS

| | | | | |
|---|---|---|---|---|
| 2,043,011 A | * | 6/1936 | Olle | ........................... 267/257 |
| 5,816,606 A | * | 10/1998 | Cruise et al. | .......... 280/124.169 |
| 6,234,507 B1 | * | 5/2001 | Dickie et al. | ............. 280/304.1 |
| 6,752,411 B2 | * | 6/2004 | Few | .................... 280/124.169 |
| 6,905,130 B2 | * | 6/2005 | Few | .................... 280/124.169 |
| 2003/0234505 A1 | * | 12/2003 | Few | .................... 280/124.169 |
| 2008/0007022 A1 | * | 1/2008 | Jones | .................... 280/124.13 |
| 2009/0152828 A1 | * | 6/2009 | Bebernes et al. | .............. 280/86 |

* cited by examiner

*Primary Examiner*—Paul N Dickson
*Assistant Examiner*—Drew Brown

(57) ABSTRACT

A suspension arrangement for a work machine includes a frame and a rear axle rigidly carried by and substantially immovable relative to the frame. The suspension arrangement includes a caster wheel assembly having a shaft, a wheel arm, a suspension and a caster wheel. The shaft is pivotably couplable with an outboard end of the rear axle. The caster wheel is coupled with a lower end of the wheel arm. The suspension is in the form of a torsion spring including an outer tube, an inner member, and a plurality of elastomeric members interposed between the outer tube and the inner member. The outer tube is coupled with the shaft, and the inner member is coupled with an upper end of the wheel arm.

19 Claims, 2 Drawing Sheets

SUSPENSION ARRANGEMENT FOR REAR CASTERED WHEELS ON A WORK MACHINE

FIELD OF THE INVENTION

The present invention relates to work machines, and, more particularly, to windrowers with castered rear wheels.

BACKGROUND OF THE INVENTION

Work machines may sometimes include one or more caster wheels which are carried by a machine frame and rotate about a generally vertical axis. The caster wheel assembly typically includes a shaft defining an axis of rotation, a fork rigidly attached to the bottom end of the shaft, and a caster wheel coupled with the distal ends of the fork. A windrower is an example of such a work machine.

Self-propelled windrowers are typically configured with large drive tires in the front and smaller castered tires in the rear. A dual-path hydrostatic system controls both propulsion and direction by controlling the speed and differential speed, respectively, of the front drive wheels. The cutting platform extends crosswise in front of the drive tires.

Ground speeds in the field are increasing. Cutting speeds with rotary cut platforms are often in the 10 to 12 mph range or higher. These ground speeds result in an increasingly rough ride for both the operator and the machine. Larger drive tire sizes offer ride improvement for the front of the machine, but do not address ride issues resulting from the smaller rear tires.

Fatigue of machine components is an additional concern. The rear axle is of particular concern. The rear axle typically consists of an adjustable length beam with a caster-mounted wheel pivoted vertically at each end. The adjustable length of the axle allows the treadwidth to be adjusted to meet varied needs. The axle is mounted on the machine such that it can pivot horizontally within limits about a point at the midpoint of the beam to allow the rear wheels to conform to uneven ground. The axle itself and the center pivot assembly must withstand horizontal and vertical loads imparted by the caster wheels. These loads increase in magnitude and frequency as ground speeds increase. Loads also increase as tread width is increased to accommodate large windrows.

Clearance under the machine must also be adequate to accommodate large windrows. The lowest machine clearance is often under the rear axle. The ability to increase this clearance is limited by the pivoting rear axle requirement because the axle must have room to move under the machine frame. One configuration gains clearance by mounting the axle on a cantilevered pivot outside the frame at the rear of the machine. While this configuration increases clearance under the machine, structural and machine length considerations make it undesirable.

It is known to utilize a rear axle suspension on a windrower. In this configuration, the rear axle consists of two, separate beams one for each caster wheel. The beams are independently pivoted at a point near the centerline of the machine such that each can pivot horizontally within limits. Caster wheels are mounted at the ends of each adjustable length axle, similar to the non-suspended configuration described above. Suspension is provided by placing a pressure-adjustable air bag between a bracket mounted on the frame of the machine and the top of each axle.

While this solution provides a suspension at the rear of the machine, it has the disadvantages of allowing excessive motion at the operator station because there is no inherent damping in the air bag, it changes the castor pivot orientation as it moves through the suspension range, and does not optimize the suspension characteristics by minimizing the unsprung mass. Further, this solution does not increase the clearance under the machine, nor does it diminish the structural concern at the axle pivots.

What is needed in the art is a work machine with castered rear wheels which provide a smooth ride and sufficient ground clearance.

SUMMARY OF THE INVENTION

The invention in one form is directed to a work machine including a frame, at least one drive wheel carried by the frame, at least one rear axle rigidly carried by and substantially immovable relative to the frame, and at least one caster wheel assembly. Each easier wheel assembly includes a shaft, a wheel arm, a suspension and a caster wheel. The shaft is pivotably coupled with an outboard end of a corresponding rear axle. The suspension is coupled with the wheel arm. The caster wheel is coupled with a lower end of the wheel arm.

The invention in another form is directed to a suspension arrangement for a work machine including a frame and a rear axle rigidly carried by and substantially immovable relative to the frame. The suspension arrangement includes a caster wheel assembly having a shaft, a wheel arm, a suspension and a caster wheel. The shaft is pivotably couplable with an outboard end of the rear axle. The caster wheel is coupled with a lower end of the wheel arm. The suspension is in the form of a torsion spring including an outer tube, an inner member, and a plurality of elastomeric members interposed between the outer tube and the inner member. The outer tube is coupled with the shaft, and the inner member is coupled with an upper end of the wheel arm.

DETAILED DESCRIPTION OF THE INVENTION

Figure 1:
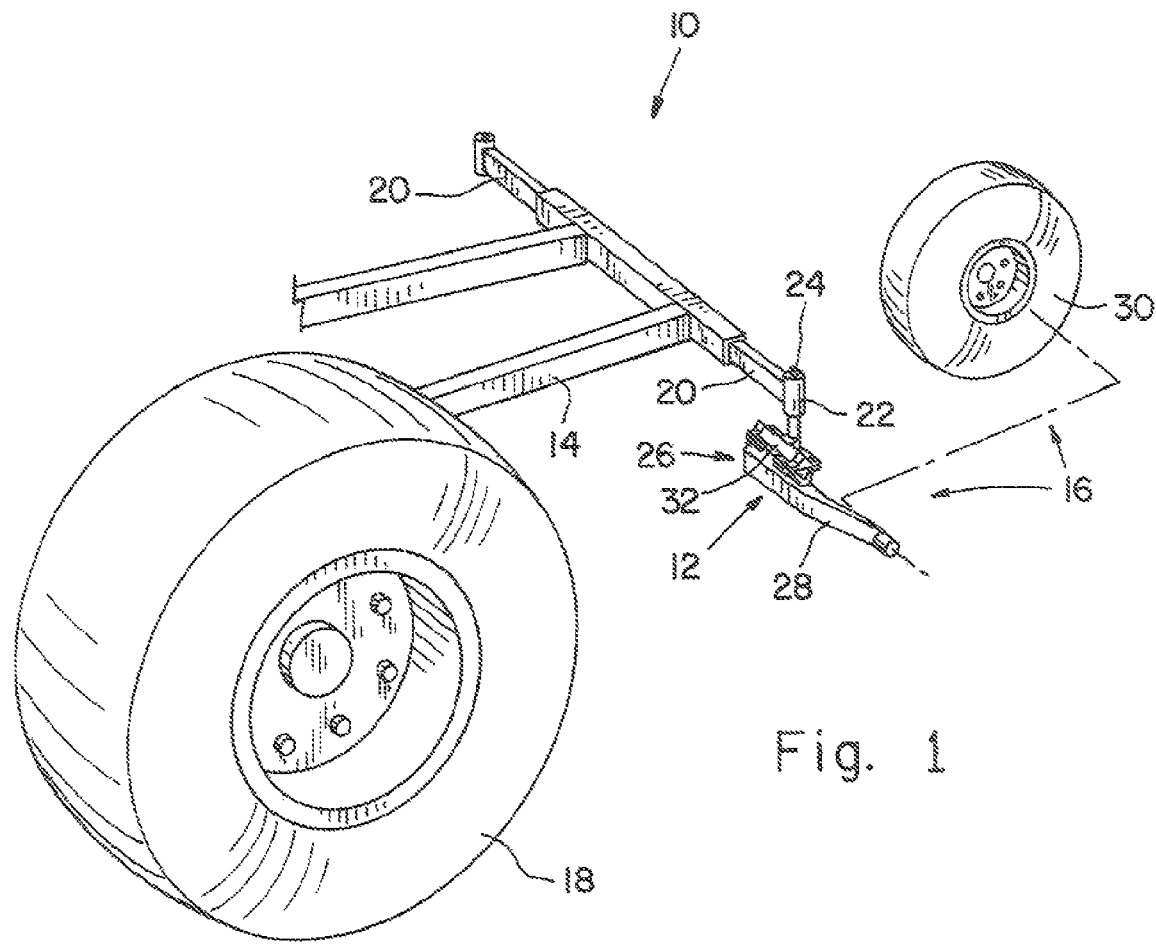
FIG. 1 is a perspective view of a portion of a work machine incorporating an embodiment of a suspension arrangement of the present invention.
Figure 2:
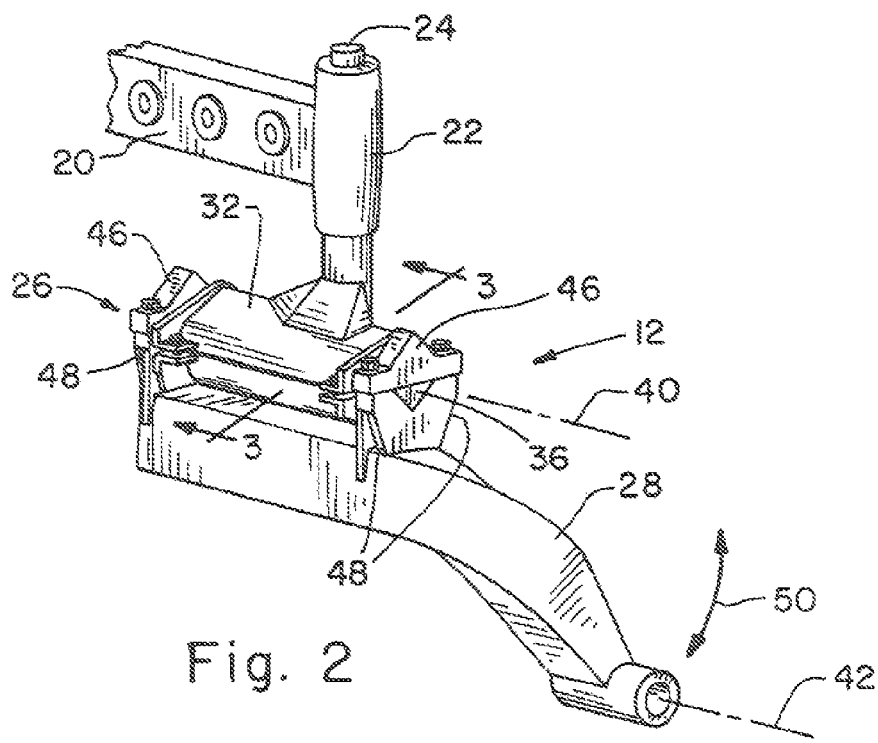
FIG. 2 is a perspective view of the suspension arrangement illustrated in FIG. 1.

Referring now to the drawings, and more particularly to FIGS. 1 and 2, there is shown a portion of a work machine 10 incorporating an embodiment of a suspension arrangement 12 of the present invention. Work machine 10 can be any type of self-propelled work machine using one or more caster wheels, such as a windrower, etc. In the embodiment shown, a portion of the lower part of a work machine in the form of a windrower 10 is shown for illustration.

Windrower 10 includes a frame 14 carrying typical components (not shown) such as an operator's station, internal combustion engine, etc. A cutting platform is typically detachably mounted at the front end of the machine below the operator's station. The engine compartment is typically mounted behind the operators station and above a pair of caster wheel assemblies 16, Only the left rear caster wheel assembly 16 is shown in FIG. 1 for simplicity, the right rear caster wheel assembly being configured substantially identical in the illustrated embodiment. Some differences in the configurations of the caster wheel assemblies 16 are possible, as will be described in more detail below.

A pair of drive wheels 18 are carried by frame 14, and hydrostatically driven in known manner. It may be also possible to drive a single wheel 18, depending upon the application.

Rear axle 20 may be a telescoping rear axle, as shown, and is rigidly mounted to and substantially immovable relative to frame 14. Rear axle 20 need not be a telescoping axle. Rear axle 20 includes an outboard end carrying a collar 22 which pivotally couples with a corresponding caster wheel assembly 16, as will be described below.

Each caster wheel assembly 18 includes a pivotable shaft 24, a suspension 28, a wheel arm 28 and a caster wheel 30 coupled with wheel arm 28. Shaft 24 is rotatably carried within collar 22 which is welded or otherwise rigidly affixed to frame 14. Wheel arm 28 is shown as a generally L-shaped single arm which curves around to the side of wheel 30, thus putting wheel 30 generally in line with shaft 24. Wheel arm 28 can also be configured generally U-shaped as a fork with distal ends on opposite sides of wheel 30. The lower or distal end of wheel arm 28 carries a stub shaft (not shown), which in turn carries a wheel hub (not shown) for mounting wheel 30 in known fashion.

Figure 3:
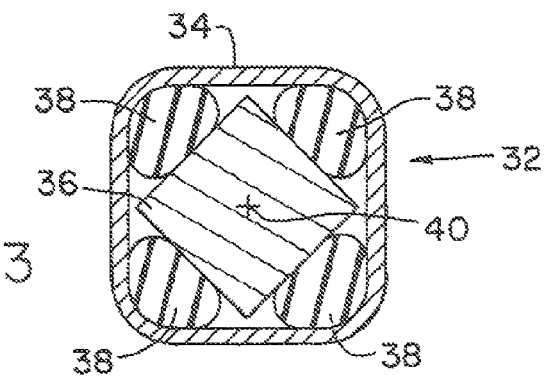
FIG. 3 is a cross sectional view through the suspension arrangement, taken along line 3-3 in FIG. 2.
Figure 4:
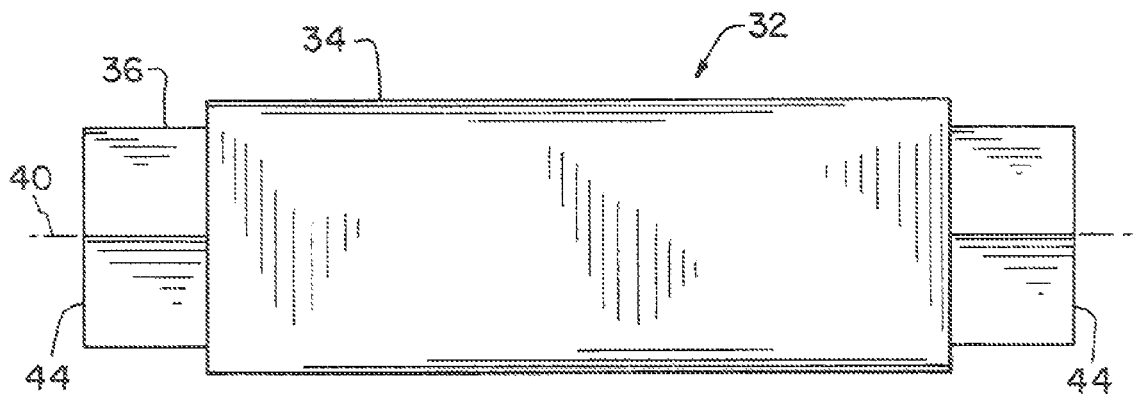
FIG. 4 is a plan view of the torsion spring shown in FIG. 3.

Referring to FIGS. 2-4, conjunctively, suspension 26 interconnects shaft 24 with wheel arm 28. Suspension 28 is configured with a torsion spring 32 but could possibly be configured with a different type of spring, depending upon the application.

Torsion spring 32 includes an outer tube 34 with a square cross section, an inner member 36 with a square cross section, and a plurality of elastomeric members 38 interposed between outer tube 34 and inner member 38. Outer tube 34 is shown coupled with shaft 24 and inner member with wheel arm 28, but it is also possible to couple outer tube 34 with wheel arm 28 and inner member 38 with shaft 24.

Outer tube 34 is coupled with shaft 24 in an offset manner along a side of outer tube 34. Inner member 36 has an axis of rotation 40 which is generally parallel to an axis of rotation 42 of caster wheel 30. Inner member 36 includes opposite ends 44 which extend axially beyond the ends of outer tube 34. A pair of clamps 46 are rigidly connected (e.g., welded) with the upper surface of the top, horizontal portion of wheel arm 28. Each clamp 48 is clamped with a corresponding end 44 of inner member 36. Each clamp 48 includes a pair of support arms 48 which extend upwardly at an angle of approximately 45° relative to vertical. This splits forces applied by the ground into two component force vectors, regardless of whether the applied force is in a horizontal or vertical direction. The force vectors tangent to the axis of rotation 40 of inner member 36 assure that a rotational force is applied to torsion spring 32.

During operation, forces are applied by the ground to wheel 30. These forces may generally either be parallel to the ground (such as an object impinging upon wheel 30), or in a vertical direction (such as a bump or the like). This causes wheel 30 to pivot in an arced manner about the axis of rotation 40 of inner member 38, as indicated by the curved, double headed arrow 50 in FIG. 2. This rotational movement of wheel arm 28 carrying wheel 30 in turn compresses elastomeric members 38 between inner member 38 and outer tube 34. This biases inner member 36 back to the static position, and also damps vibrations which are transferred to frame 14.

Having described the preferred embodiment, it will become apparent that various modifications can be made without departing from the scope of the invention as defined in the accompanying claims.

The invention claimed is:

1. A work machine, comprising:
   a frame;
   at least one drive wheel carried by said frame;
   at least one rear axle rigidly carried by and substantially immovable relative to said frame; and
   at least one caster wheel assembly, each said caster wheel assembly including a shaft, a wheel arm, a suspension and a caster wheel, said shaft pivotably coupled with an outboard end of a corresponding said rear axle, said suspension being interposed between said wheel arm and said shaft, said caster wheel coupled with a lower end of said wheel arm.

2. The work machine of claim 1, wherein said suspension is a torsion spring.

3. The work machine of claim 2, wherein said torsion spring includes an outer tube with a square cross section, an inner member with a square cross section, and a plurality of elastomeric members interposed between said outer tube and said inner member, said outer tube being coupled with one of said shaft and said wheel arm, and said inner member being coupled with an other of said shaft and said wheel arm.

4. The work machine of claim 3, wherein said outer tube is coupled with said shaft and said inner member is coupled with said wheel arm.

5. The work machine of claim 4, wherein said shaft is coupled with said torsion spring in an offset manner along a side of said outer tube.

6. The work machine of claim 4, wherein said inner member extends axially beyond both ends of said outer tube, and further including a pair of clamps coupled with said wheel arm, each said clamp being clamped with a corresponding said end of said inner member.

7. The work machine of claim 6, wherein each said clamp includes a pair of support arms extending upwardly at an angle of approximately 45° relative to vertical.

8. The work machine of claim 3, wherein said caster wheel has an axis of rotation, and said inner member of said torsion spring has an axis of rotation which is generally parallel to said axis of rotation of said caster wheel.

9. The work machine of claim 3, wherein said wheel arm has a generally horizontal upper portion, and said torsion spring is coupled with said horizontal upper portion.

10. The work machine of claim 3, wherein said wheel arm is one of generally L-shaped and generally U-shaped.

11. A suspension arrangement for a work machine including a frame and a rear axle rigidly carried by and substantially immovable relative to the frame, said suspension arrangement comprising:
    a caster wheel assembly including a shaft, a wheel arm, a suspension and a caster wheel, said shaft pivotably couplable with an outboard end of said rear axle, said caster wheel coupled with a lower end of said wheel arm, said suspension being a torsion spring including an outer tube, an inner member, and a plurality of elastomeric members interposed between said outer tube and said inner member, said outer tube being coupled with said shaft, and said inner member being coupled with an upper end of said wheel arm such that said suspension is between said shaft and said wheel arm so that said wheel arm is flexibly suspended relative to said shaft.

12. The suspension arrangement of claim 11, wherein said inner member extends axially beyond both ends of said outer tube, and further including a pair of clamps coupled with said wheel arm, each said clamp being clamped with a corresponding said end of said inner member.

13. The suspension arrangement of claim 12, wherein each said clamp includes a pair of support arms extending upwardly at an angle of approximately 45° relative to vertical.

14. The suspension arrangement of claim 11, wherein said shaft is coupled with said torsion spring in an offset manner along a side of said outer tube.

15. The suspension arrangement of claim 11, wherein said outer tube has a generally square cross section and said inner member has a generally square cross section.

16. The suspension arrangement of claim 11, wherein said caster wheel has an axis of rotation, and said inner member of said torsion spring has an axis of rotation which is generally parallel to said axis of rotation said caster wheel.

17. The suspension arrangement of claim 11, wherein said wheel arm has a generally horizontal upper portion, and said torsion spring is coupled with said horizontal upper portion.

18. The suspension arrangement of claim 11, wherein said wheel arm is one of generally L-shaped and generally U-shaped.

19. The suspension arrangement of claim 11, wherein said rear axle is a telescoping rear axle.

* * * * *